April 3, 1928.  R. RUTHERFORD  1,664,864
SCOOTER
Filed June 18, 1925
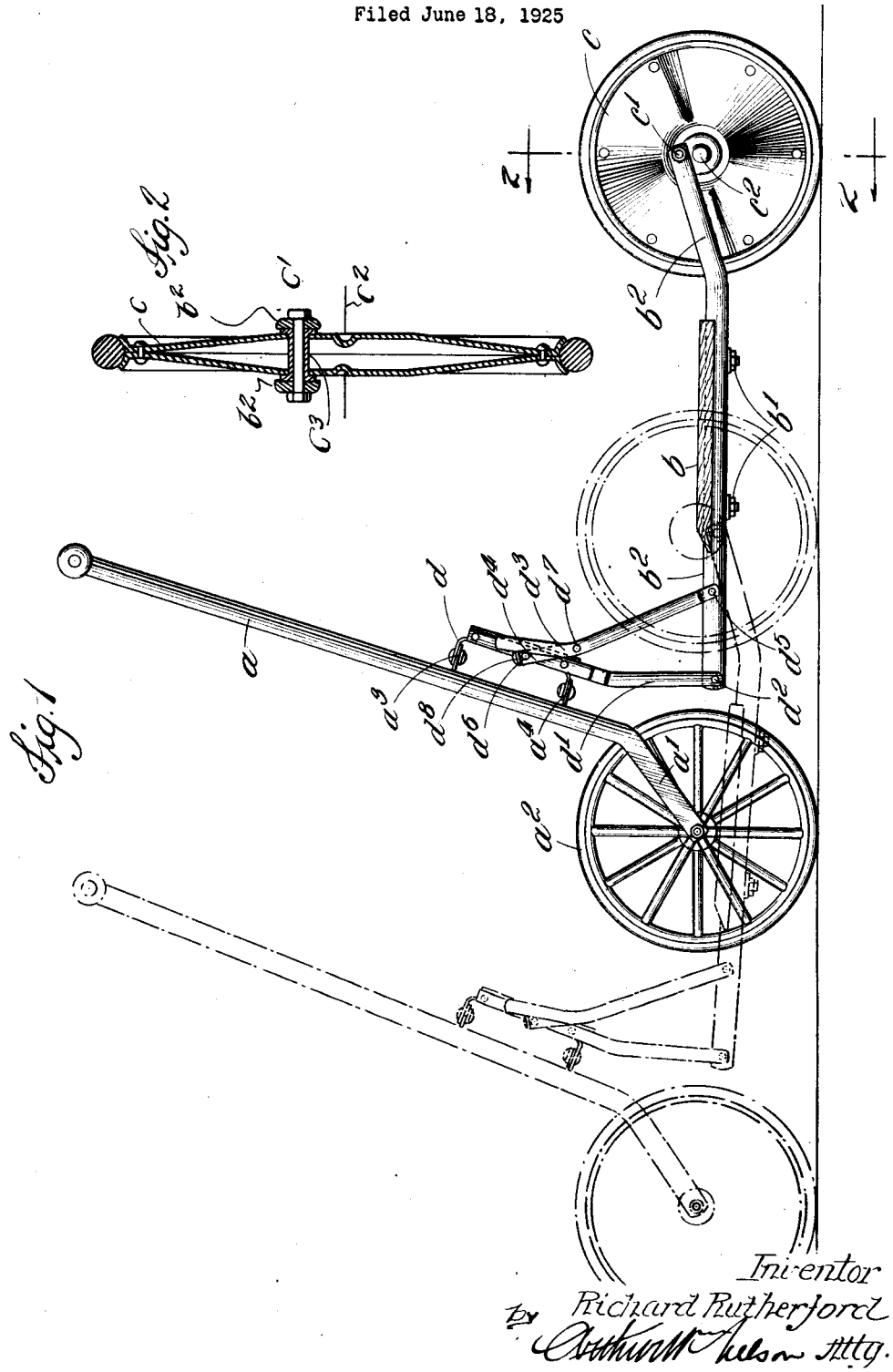
Inventor
Richard Rutherford
by Arthur M Nelson Atty.

Patented Apr. 3, 1928.

1,664,864

UNITED STATES PATENT OFFICE.

RICHARD RUTHERFORD, OF LONDON, ENGLAND, ASSIGNOR TO FREDERICK HAGGER HEADLEY, OF BIRMINGHAM, ENGLAND.

SCOOTER.

Application filed June 18, 1925, Serial No. 37,887, and in Great Britain September 16, 1924.

This invention relates to scooters comprising a foot-board supported on wheels and provided at one end with a steering column, and has for its object to enable the same to be propelled solely by the motion of the rider's body without the necessity of applying the foot to the ground. This object is attained, according to this invention, by mounting one or more of the running wheels—preferably the rear wheel—eccentrically in the scooter, so that when the rider suitably rocks his body, an oscillatory motion is imparted to the foot-board and the scooter is thereby propelled.

In the accompanying drawing Fig. 1 shows a side elevation of a scooter, the rear wheel of which is eccentrically mounted. Fig. 2 is a vertical section on an enlarged scale, through the rear wheel of the scooter as taken on the line 2—2 of Fig. 1.

Referring to the drawing, the scooter proper is of the usual construction and comprises a steering column $a$ with front forks $a^1$ having concentrically mounted therein the front wheel $a^2$, the said steering column being pivoted to the chassis of the scooter which comprises a foot-board $b$, secured by means of bolts $b^1$ to the metal bars $b^2$ (of which only one appears in the drawing) comprising an under frame, the rear ends of the said bars constituting the fork for the rear wheel $c$.

Suitable means for pivoting the steering column to the under frame may comprise two lugs $a^3$ and $a^4$ fixed to the steering column $a$, to which lugs is pivoted a U-shaped member $d$ carried by links $d^1$ (of which only one appears in the drawing) pivoted at their lower ends $d^2$ to the forward end of the under frame $b^2$. Across the angle between the under frame $b^2$ and each of the links $d^1$ is arranged a collapsible strut comprising members $d^3$ and $d^4$ which are pivoted, at $d^5$ and $d^6$ respectively, to the underframe and to the links $d^1$. The two members are pivoted together at $d^7$ and the member $d^4$ is furnished at its upper end with a laterally extending abutment $d^8$ arranged to bear against the front edge of the upper end of the member $d^3$ to receive the forward thrust of the upper rearwardly bent portions of the member $d^3$ when the scooter is in use. In order to fold up the scooter it is merely necessary to push the joint $d^7$ rearwardly whereupon the steering column $a$ can be folded down on to the under frame $b^2$.

The said rear wheel $c$ is eccentrically mounted, as shown, the spindle $c^1$ being displaced from the centre $c^2$ of the wheel itself. Conveniently, the wheel $c$ may, as shown in the drawing, have dished discs instead of spokes and the hub for the spindle $c^1$ may comprise a tube $c^3$ flanged or beaded over at its ends into tight engagement with the discs as best shown in Fig. 2. Such a hub is easy to construct and imparts strength and rigidity to the wheel.

Any desired degree of eccentricity may be provided for, but it has been found convenient in practice to displace the spindle $c^1$ one inch from the centre of the wheel so as to give a rise and fall of two inches to the rearward extremity of the chassis.

To start the scooter, the spindle $c^1$ should be slightly in advance of the top dead centre so that the weight of the body on the scooter causes the rear wheel to revolve. When the wheel has turned approximately through half a revolution, the scooter will have assumed a position as shown in chain lines in the drawing and the weight of the user is then transferred to the front of the machine, thereby relieving the pressure on the rear wheel and aiding the same to return to its original position of just over top dead centre, whereupon the above operation can be repeated as often as desired. In other words, the weight of the user is thrown forwards and backwards, giving the body a rocking motion which corresponds to the motion of the eccentric wheel spindle.

Owing to the absence of any complicated mechanism, as in mechanically propelled scooters previously proposed, it will be obvious that scooters constructed in accordance with this invention are simple and cheap to produce.

I claim:

1. A scooter comprising an underframe of substantially parallel bars, a footboard mounted on said underframe, a steering column, a running wheel mounted concentrically in said steering column, means for connecting said underframe and said steering column, a rear disc wheel, a hub eccentrically mounted in said rear wheel, said hub comprising a tube flanged over at its ends tightly on the opposite faces of the wheel and a spindle eccentrically mounted in the rear end of said underframe and also freely passing through said hub.

2. A scooter comprising an underframe of substantially parallel bars, a foot-board mounted on said under under frame, a steering column, a running wheel mounted concentrically in said steering column, means for pivotally connecting said underframe and said steering column comprising rearwardly extending lugs on said steering column, a U-shaped member pivoted to said lugs, links secured to said U-shaped members and pivoted to said underframe, struts pivoted to said underframe and having their upper ends bent rearwardly, arms pivoted to said struts and to said links and having abutments at their upper ends adapted to bear against the front edge of the upper ends of the said struts, a rear wheel eccentrically mounted in said underframe, and a spindle mounted in the rear end of said underframe and also passing through said rear wheel.

3. A scooter comprising an underframe of substantially parallel bars, a foot-board mounted on said underframe, a steering column, a running wheel mounted concentrically in said steering column, means for pivotally connecting said underframe and said steering column comprising rearwardly extending lugs on said steering column, a U-shaped member pivoted to said lugs, links secured to said lugs and pivoted to said underframe, struts pivoted to said underframe and having their upper ends bent rearwardly, arms pivoted to said struts and to said links and having abutments at their upper ends adapted to bear against the front edge of the upper ends of the said struts, a rear disc wheel, a hub mounted in said rear wheel, said hub comprising a tube flanged over at its ends tightly on to the opposite faces of the wheel, and a spindle eccentrically mounted in the rear end of said underframe and also passing through said hub.

In testimony whereof I have signed my name to this specification.

RICHARD RUTHERFORD.